United States Patent [19]

Gould et al.

[11] 4,449,113

[45] May 15, 1984

[54] OIL PRESSURE SENDER WITH FRICTION FREE RESISTOR DEVICE

[75] Inventors: Richard E. Gould, Shelby; William P. Page, Kings Mountain, both of N.C.

[73] Assignee: Fasco Controls Corporation, Shelby, N.C.

[21] Appl. No.: 506,726

[22] Filed: Jun. 22, 1983

[51] Int. Cl.³ ............................................. H01L 10/10
[52] U.S. Cl. ....................................... 338/39; 338/42; 73/725; 73/115
[58] Field of Search ............... 338/39, 42, 36; 73/719, 73/725, 746, 115

[56] References Cited

U.S. PATENT DOCUMENTS

| | | | |
|---|---|---|---|
| 1,989,673 | 2/1935 | Apple et al. | 73/115 X |
| 2,439,092 | 4/1948 | Linstrom | 338/42 |
| 4,279,162 | 7/1981 | Neill et al. | 338/39 X |

*Primary Examiner*—Roy N. Envall, Jr.
*Assistant Examiner*—Christopher N. Sears
*Attorney, Agent, or Firm*—Shlesinger, Fitzsimmons & Shlesinger

[57] ABSTRACT

The housing has a flexible diaphragm secured over a fluid pressure inlet port in one end thereof, and a cover secured over an opening in the opposite end thereof. A plunger is mounted to reciprocate in the housing between said diaphragm and said cover in response to changes in fluid pressure at the inlet. Secured in the housing beneath the cover is a ceramic chip or substrate, which has a plane surface that extends normal to the axis of the plunger. A spirally shaped resistor element is printed or otherwise formed on the face of the chip, and a conically coiled compression spring is located in the housing between the resistor element and the plunger, and in such manner that its outer convolution at the larger end thereof is engaged with the outer convolution of the spirally shaped resistor element. The smaller end of the spring is connected to the plunger to be reciprocated thereby toward and away from the resistor element. The windings or convolutions of the conical spring register with the spirally shaped convolutions of the flat resistor element, so that as the spring is pressed toward the element it progressively engages more and more of its length with the registering convolutions of the resistor element, thereby progressively shunting out more and more of the resistor from the associated indicator circuit. Conversely, as the plunger moves in the opposite direction the conical spring expands and progressively removes more and more of its length from engagement with the resistor element, thereby increasing the amount of resistance placed in the associated circuit.

14 Claims, 4 Drawing Figures

OIL PRESSURE SENDER WITH FRICTION FREE RESISTOR DEVICE

BACKGROUND OF THE INVENTION

This invention relates to oil pressure senders, and more particularly to an improved, transducer-type sender which utilizes a fluid pressure-responsive diaphragm in combination with a friction free variable resistor for producing an electrical signal that is proportionate to pressure changes in a fluid. Even more particularly this invention relates to a pressure sender of the type described which utilizes a novel, friction free, variable resistor device in the form of a conical compression spring, which overlies and is engagable against a spirally shaped resistor element.

It has long been commonplace to employ in automotive vehicles, for example, transducer-type fluid pressure indicators for monitoring the oil pressure in the engine crankcase. The sender is an electro-mechanical type of transducer, which utilizes a piston, diaphragm or similar member for transmitting variations in a fluid pressure to an adjustable resistor element, or the like, in an electrical indicator circuit. Typically the adjustable resistor element comprises a slidable or rotatable operating arm, which is moved in response to changes in the position of the mechanically operated member that is interposed between the elements and the fluid pressure system.

Regardless of the mechanical means employed for operating the adjustable resistor element, a major problem heretofore encountered with pressure senders of the type described has been the undesirable wear and tear which results from the repeated movement of the adjustable element in response to changes in fluid pressure. A primary reason for this wear is that most such variable resistors heretofore have employed a spring-loaded wiper contact which has sliding, frictional engagement with a resistance wire, such as for example a wire coil. Either the wiper or the coil is shifted axially one relative to the other selectively to introduce more or less of the resistance wire coil into an associated circuit. Regardless of the exact shape of the resistance wire element, and regardless also of whether the wiper or the coil itself is shifted one relative to the other, the result is the introduction of a substantial and undesirable amount of friction wear between their respective sliding surfaces. In the case of oil pressure senders of the type described, this friction wear tends to reduce undesirably the operating life of the sender.

It is a primary object of this invention, therefore, to develop an oil pressure sender of the type described which eleminates the above-noted undesirable frictional sliding movement between the components of its adjustable resistor.

To this end it is an object of this invention to employ in a pressure sender of the type described a novel resistor in the form of a conically shaped spring element, which is compressible axially relative to a stationary, spirally shaped resistor element in response to pressure changes in a fluid system that is being monitored, thereby to add to or remove resistance from an associated indicator circuit simply by introducing more or less of the conical spring wiper into engagement with the spiral resistor, and without introducing any sliding engagement whatsoever between the conical spring element and spiral resistor element.

Heretofore efforts have been made to utilize non-sliding contacts in variable resistors employed for indicating pressure changes in a system. In U.S. Pat. No. 2,439,092, for example, the resistance wire itself is secured in spiral form on a flexible diaphragm, which is interposed between a fluid pressure source and a segmental-spherical contact. As pressure increases the contact is forced against the wire and diaphragm, causing the latter to bow, so that as more and more of the surface of the contact is forced into engagement with the spiral resistance wire, the resistance in the circuit is diminished. The disadvantage of this type of mechanism, however, is that the resistance wire is secured on the flexible diaphragm and is therefore subjected to constant flexing, which tends to minimize the life of the resistor. Moreover, any flexing of the resistance wire itself results in a change in the resistance of the wire, thereby making it extremely difficult to calibrate when used in a sender of the type described herein.

U.S. Pat. No. 1,989,673 also discloses the use of a spirally wound resistance wire for regulating the amount of power delivered to a brake mechanism. Again, the disadvantage of such a system is that the resistance wire itself is wound in spiral form and is flexed axially during use, thereby minimizing the overall life of the mechanism and also making it extremely difficult to calibrate. Similar concepts are disclosed in U.S. Pat. Nos. 488,121, 260,622, and 266,911.

British Pat. No. 265,676 discloses a variable resistor in the form of a convolutely wound wire spring, the smaller end of which is driven by a screw toward and away from a plane surface which has been metallized by the application thereto of, for example, suitable conducting material in the form of Indian Ink. As the coils are pressed toward the conductive ink surface the resistance is reduced, and conversely, as the coil is shifted away from the conductive surface the resistance in the circuit is increased. Again, it is the convolute spring itself which is functioning as the resistance wire.

It is a further object of this invention, therefore, to provide an improved oil pressured sender which utilizes a flat, spirally shaped resistance material of the type described which is stationary during use, so that the life of the sender is prolonged, and so that its calibration is simplified, as compared to prior such devices.

Other objects of the invention will be apparent hereinafter from the specification and from the recital of the appended claims, particularly when read in conjunction with the accompanying drawings.

SUMMARY OF THE INVENTION

A rolling diaphragm is mounted in the housing of an oil pressure sender to be exposed at one side to the oil pressure, and at its opposite side to an axially shiftable, spring-loaded plunger. Disposed between the plunger and a transverse ground plate that is secured in the end of the housing remote from the diaphragm, is a conical compression spring. The smaller end of this spring surrounds and is engaged with the inner end of the plunger, and the opposite, larger end of the spring is engaged against the outer convolution of a flat, spirally wound resistance element, which is printed or otherwise formed on the plane, inside surface of the ground plate. The spiral wound resistance element is connected at one end to the ground plate for grounding on the housing, and is connected at its opposite end to the terminal end of the largest winding of the conical spring.

Adjustably threaded to the plunger between the diaphragm and the conical compression spring is a generally cup-shaped spring retainer which has a lateral flange that is engaged with one end of a large compression spring, the opposite end of which is seated against a circumferential shoulder formed in the housing around the outside of the conical spring. The spring retainer is shiftable axially in the housing with the plunger in response to pressure changes detected by the diaphragm, but its lateral flange is hexagonal in configuration, and slides in a correspondingly shaped bore in the housing, so that the spring retainer is secured against rotation relative to the housing.

Normally the large compression spring retains the plunger in a first limit position in which the conical compression spring is in its expanded position, whereby only its outer winding or convolution engages with the corresponding outer convolution of the spiral resistor. However, when the fluid pressure increases, the diaphragm forces the plunger in a direction to compress the conical compression spring, the convolutions of which are therefore shifted axially and progressively into engagement with the inwardly spiraling portions of the resistance element, thereby progressively shunting out more and more of the resistance element from an associated indicator circuit. Conversely when the system pressure drops, the large compression spring forces the plunger back toward its original position, thereby causing the conical compression spring to expand and progressively to remove its convolutions from engagement with the registering, flat convolutions of the spiral resistor, thereby progressively increasing the resistance in the associated circuit.

For calibration purposes an Allen wrench, for example, can be inserted through an opening in the center of the printed resistor, and into a cooperating recess in the confronting end of the plunger, which can then be rotated relative to the cup-shaped spring retainer thereby adjusting the compression in the large compression spring, and in turn calibrating the conical compression spring.

THE DRAWINGS

DETAILED DESCRIPTION OF THE PREFERRED EMBODIMENTS

Figure 1:
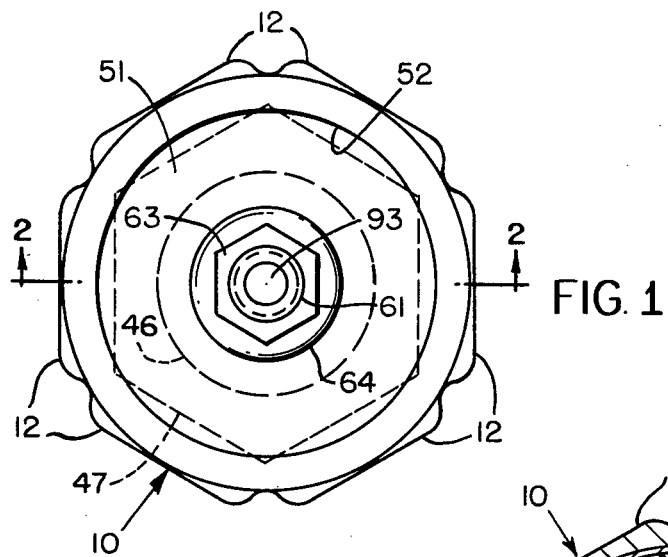
FIG. 1 is a plan view of a pressure sender made according to one embodiment of this invention.

Referring now to the drawings by numerals of reference, 10 denotes generally an elongate, metal housing, which is generally in the form of a cylinder having in its upper end (FIG. 2) an axial bore 11, and having formed on its outer periphery a plurality of axially extending, angularly spaced flat surfaces 12, which are arranged in a hexagonal pattern around the outside of the housing to provide conventional wrench surfaces therefor. On its lower end the housing 10 has an externally threaded, annular extension or shank portion 14, the bore of which communicates through a cavity or pressure chamber 15 in the housing with the lower end of the bore 11. Secured in the bore of the shank section 14, and projecting therefrom into the chamber 15 is a conventional X or Y-shaped adjusting pin 16, which does not interfere with the flow of fluid pressure into or out of chamber 15.

The upper end of the adjusting pin 16 is engagable with the underside of a flexible, circular diaphragm 21, the marginal edge of which is sealingly secured against a transverse, circumferential shoulder 22, which is formed in the housing 10 at the bottom of its bore 11. Diaphragm 11, which may be similar to one of those disclosed in the commonly owned pending application of Richard E. Gould, Ser. No. 447,779, filed Dec. 8, 1982, has formed thereon adjacent its outer edge a ring bead 23. Bead 23 projects into an annular recess 24, which is formed in the underside of a modified cup-shaped element or diaphragm retainer 25. The outer peripheral surface of the upstanding annular wall portion of the retainer 25 is generally frusto conical in configuration, so that its upper end seats snugly and coaxially against the bore 11 in housing 10, while its lower end, which is engaged against the housing shoulder 22, is radially spaced slightly more from the inside of bore 11.

The inner peripheral surface 26 of the upstanding annular wall of retainer 25, on the other hand, is hexagonal in cross section for a purpose noted hereinafter. Also, the retainer 25 has formed therein a reduced-diameter, tubular guide 28, which is supported centrally of the retainer by means of an integral, circumferential boss 29, which projects upwardly (FIG. 2) from the lower, closed end of the retainer 25 radially inwardly of its bead retaining recess 24.

Mounted adjacent its upper end for sliding, axial movement in the bore of the tubular guide 28 is a cylindrical plunger 31, the lower end of which projects out of the bottom of guide 28 and has formed thereon an integral, upstanding, annular skirt 33. The annular wall portion of skirt 33 is radially spaced from the periphery of plunger 31, so as to form between the skirt 33 and the lower end of plunger 31 an annular recess 35 for accommodating the lower end of the tubular guide 28, when the plunger 31 is caused to be shifted axially upwardly from its position as shown in FIG. 2, such as for example by the admission of fluid under pressure to the pressure chamber 15 as noted hereinafter.

Plunger 31 is engaged at its upper end with the rounded, lower end 41 of an externally threaded adjusting screw 42, which has formed thereon adjacent its upper end an enlarged-diameter, nut-shaped head 43, which is hexagonally shaped in cross section. Adjacent its lower end screw 42 is adjustably threaded centrally into the upper, closed end 45 of an inverted, generally cup-shaped spring retainer 46, the lower, open end of which is surrounded by an integral, outwardly projecting lateral flange 47. The outer periphery of flange 47 has a hexagonal configuration similar to that of the bore 26 in the diaphragm retainer 25, but is slightly smaller than bore 26 so that the retainer 46 is held against rotational movement in bore 26, but is axially slidable relative to the diaphragm retainer 25.

The upper end of the bore 11 in housing 10 is closed by a generally disc-shaped, dielectric insulating cover 51, which is secured in the housing 10 by crimping the upper end of the housing over the marginal edge of the cover as at 52. Fastened beneath cover 51 and against the upper end of the upstanding, annular wall of the retainer 25 is a resistor assembly comprising an annular, dielectric insulator element 54, and an annular grounding plate 55, which is seated against the underside of cover 51 coaxially thereof. Plate 55 is bent downwardly adjacent its outer periphery so as to form thereon an annular, downwardly projecting skirt portion 56, which surrounds the outer peripheral surface of the insulator element 54, and which has a portion at the lower end thereof crimped inwardly to overlie part of the underside of the element 54 between the latter and the upper end of the diaphragm retainer 25.

Figure 2:
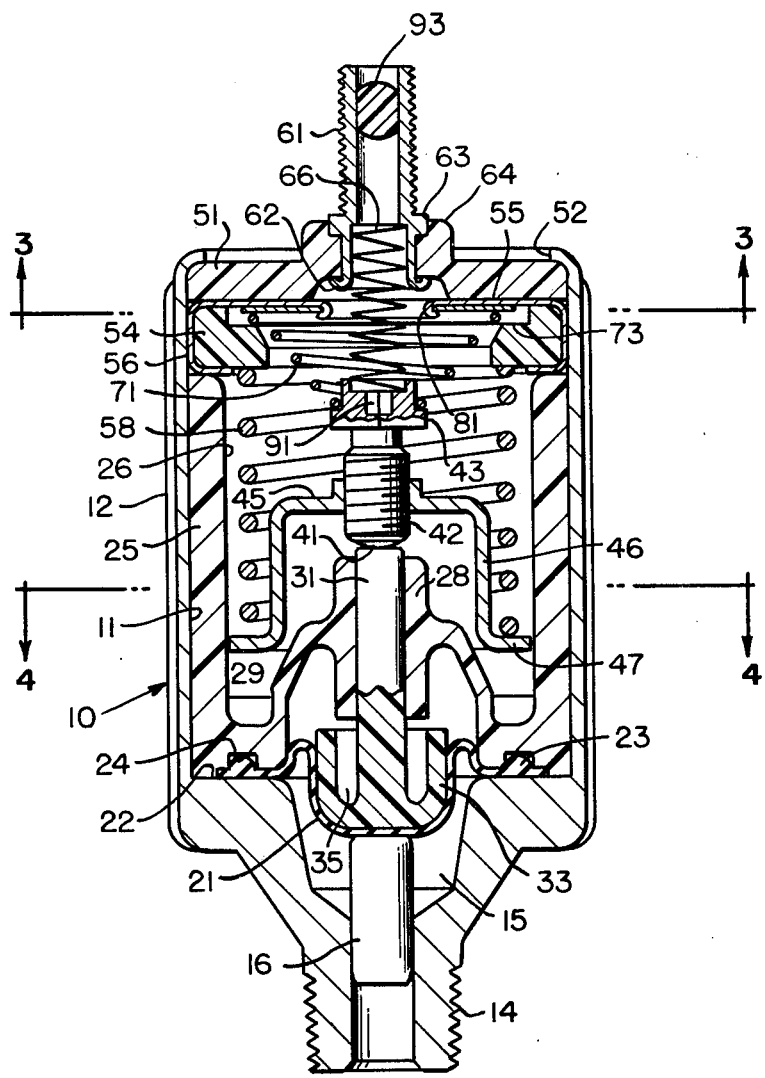
FIG. 2 is a sectional view taken generally along the line 2—2 in FIG. 1 looking in the direction of the arrows, and with portions of the sender being shown in full.

As shown more clearly in FIG. 2, the insulator element 54 extends radially inwardly beyond the skirt 56 of the gounding plate 55, and is engaged at its underside with the upper end of a coiled compression spring 58, which surrounds and is radially spaced outwardly of screw 42. The lower end of spring 58 surrounds retainer 46 and seats against its lateral flange 47, so that spring 58 is thus retained between the insulator element 54 and the retainer flange 47. Accordingly, as will be apparent from an examination of FIG. 2, when the upper end of housing 10 is crimped over the cover 51, the cover and the resistor assembly 54, 55 urge the diaphragm retainer 25 axially downwardly in the housing so that the diaphragm bead 23 is secured snugly in recess 24 in the bottom of retainer 25. The compression spring 58 then operates normally to urge the retainer 46, the attached screw 42, and thus the plunger 31, resiliently downwardly in the housing 10 relative to the retainer 25.

Secured adjacent its lower end in an axial bore in the cover 51 is a tubular, metal terminal 61, which has its lower end peaned or crimped over as at 62 against the underside of the cover 51, and which has an externally threaded portion that extends above the cover to the exterior of the housing. Intermediate its ends the terminal 61 has formed thereon an enlarged, hexagonally shaped flange of nut 63, which seats in a correspondingly shaped recess formed in a circular boss 64 that projects from the outer surface of cover 51 coaxially thereof. Seated at one end in a counterbore formed in the lower end of the terminal 61, and extending at its opposite end coaxially through the bore in plate 55, and into a registering counterbore formed in the upper end of the adjusting screw 42, is another compression spring 66, which is substantially smaller than spring 58. The purpose of spring 66 is to form an electrical conductor between the terminal 61 and the metal adjusting screw 42 for purposes noted hereinafter.

A conically shaped compression spring 71 has one end thereof (the smaller end) seated against the upper surface of the nut 43 on the adjusting screw 42 and around the upper end portion of the screw which encloses the lower end of the spring 66. The progressively larger (in diameter) windings of the spring 71 extend upwardly (FIG. 2) in the housing through the central opening in the annular insulator element 54, and toward the underside of the grounding plate 55. The bore in the insulator element 54 diverges outwardly adjacent its upper end (FIG. 2) and terminates in an annular recess 73 in which the largest coil of the spring 71 is seated with the terminal end 74 bent radially outwardly to extend into a registering notch 75 that is formed in element 54 adjacent its outer edge.

Figure 3:
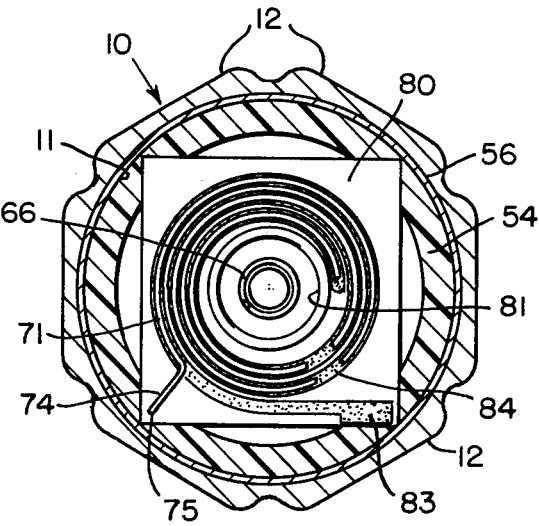
FIG. 3 is a sectional view taken generally along the line 3—3 in FIG. 2 looking in the direction of the arrows, but showing the conical compression spring in full for the purpose of illustrating its registry with the spirally shaped resistance element.
Figure 4:
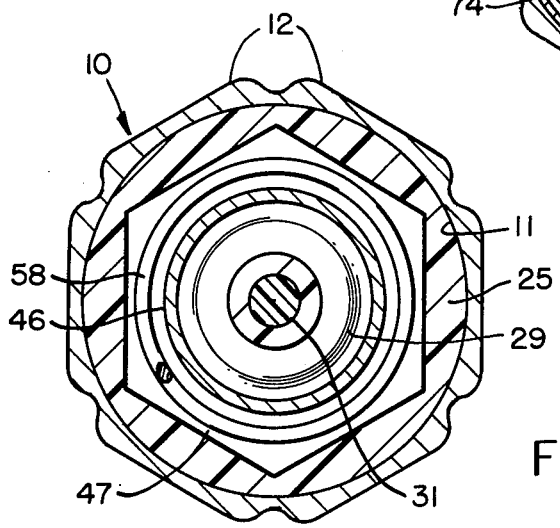
FIG. 4 is a sectional view taken generally along the line 4—4 in FIG. 2 looking in the direction of the arrows.

As shown in FIGS. 2 and 3, a marginal portion of the grounding plate 55 around its axial bore is coined over as at 81 around the edge of a central opening that is formed in a rectangularly shaped ceramic chip or substrate 80, which is secured in the upper end of element 54 beneath plate 55. Pattern printed or otherwise formed on the underside of the chip 80 radially outwardly of edge 81 is a flat, spirally shaped resistor element 83. The outermost coil or convolution of element 83 is electrically connected to ground plate 55, and registers with, and normally is at least partially engaged by, the outermost coil of the conical compression spring 71. The remaining or inwardly spiraling leg 84 of element 83 is slightly wider than, and registers axially with, the remaining, inwardly spiraling portion of the conical spring 71.

Conceivably, therefore, if the spiral spring 71 were to be compressed axially toward the ground plate 55, substantially all of the spring 71 would be urged into coplanar engagement with the spiral resistor element 83. In practice, of course, the compression spring 71 is never completely compressed into a flat plane, but as its smaller end is shifted axially upwardly in FIG. 2 or towards the ground plate 55, more and more of its axial length becomes engaged with the spirally shaped resistor element 83, thereby progressively shunting out more and more of the resistor element from the associated circuit, as noted hereinafter. Conversely, as the axial pressure on spring 71 is decreased, thus permitting it to expand downwardly or away from the ground plate 55, more and more of the resistor element 83 will be progressively introduced into the associated circuit, thereby progressively increasing the resistance to current flow in the circuit until the resistance reaches a maximum, as for example when spring 71 is in its position as shown in FIG. 2.

During the manufacture of this sender, when the above-noted parts have been assembled in housing 10, the resistor element is finally calibrated by inserting an Allan wrench or the like through the bore in the terminal 61, and downwardly into a hexagonally shaped socket 91 (FIG. 2) formed in the upper end of the adjusting screw 42. The wrench can then be used to rotate screw 42 slightly relative to the retainer 46, thereby adjusting the compression in the spiral compression spring 71, and consequently the amount of the spring 71 which will initially be engaged with the printed resistor element 83. After the calibration has been completed a hole plug 93 in the form of a rubber ball, or the like, can be press fit into the bore in the terminal 61 to seal the interior of housing 10. Other obvious alternatives for sealing the bore in a terminal 61 will be readily apparent to one skilled in the art.

In use, the housing 10 is adapted to be mounted on an automobile engine, or the like, with the bore in its shank portion 14 communicating with the lubricating oil in the engine crankcase, whereby the plate 55 will be grounded through the steel housing 10 to the automobile engine. The terminal 61 is connected through a conventional indicator circuit (not illustrated) to the battery or other power supply of the vehicle, so that a circuit is completed from terminal 61, through spring 66, the metal adjusting screw 42, the spiral compression spring 71, the spiral resistor element 83, and plate 55 to ground. When the engine is off and no fluid pressure exists in chamber 15, the spring 71 will be in its fully expanded position as shown in FIG. 2, in which case the entire resistor element 83 will be placed in the indicator circuit.

On the other hand, as fluid pressure in chamber 15 increases diaphragm 21 is urged in a direction which forces the plunger 31 axially upwardly in FIG. 2 and against the rounded underside 41 of the adjusting screw 42, which forms a pivot point that prevents any rotation that might be imparted to the retainer 46 by the compression spring 58 from being imparted to the diaphragm 21. Any axial motion of the plunger, 31, however, is imparted directly to the adjusting screw 42, which in turn causes the spring 71 to be progressively compressed, thereby progressively shunting out more and more of the resistor element 83 from the circuit, and thereby progressively decreasing the resistance of the circuit. Conversely, as the pressure in chamber 15 drops the spring 71 will expand and progressively increase the resistance in the circuit. The obvious advantage of this method of adjusting the resistance is that absolutely no sliding contact exists between the resistor element 83 and the associated conical conductor 71. Instead, as pressure changes occur the spring 71 simply presses more or less of its length into engagement with the surface of the flat resistor element 83, thus eliminating any wear which might otherwise be introduced as a result of any sliding contact between these surfaces.

Still another advantage of this invention is that by very small axial movements of the conical spring 71 it is possible to produce rather large changes in the value of the resistance placed in the circuit by element 83, depending simply upon the design specifications of the spring 71 and the cooperating resistor element 83. Furthermore, this type of construction permits very substantial reduction in the overall size of the pressure sender, since the resistor element itself can be held stationary and in a plane extending transversely of the axis of the sender. This contrasts with a great many prior art senders which utilize conventional, coil-shaped resistance wire elements which require longer housings to permit the necessary axial movement of the associated wiper contact.

While this invention has been illustrated and described herein in connection with the monitoring of fluid pressure in an automotive vehicle, it will be readily apparent that the pressure sender can be used for similar purposes for measuring other types of fluid pressures, or even for measuring other parameters, wherein the adjustable element is moved perpendicular to the printed resistor pattern by a motivating force other than fluid pressure. Moreover, although this invention has been illustrated and described in connection with only certain embodiments thereof, it will be apparent that this application is intended to cover any further modifications as may fall within the scope of one skilled in the art or the appended claims.

What we claim is:

1. A fluid pressure transducer, comprising
   a housing closed at one end and having a fluid pressure inlet in its opposite ends,
   fluid pressure sensing means in said housing including a plunger mounted in said housing to reciprocate between opposite ends thereof in response to changes in the pressure of the fluid supplied to said inlet,
   a flat, spirally shaped resistor element mounted in said housing with its convolutions lying in a plane extending transversely of the direction of reciprocation of said plunger,
   means for connecting said resistor element in a fluid pressure indicator circuit, including a conically coiled, electrically conductive spring element mounted in said housing adjacent said resistor element with the convolutions thereof registering coaxially with the convolutions of said resistor element, and
   means connecting said plunger to one of said elements, whereby when said plunger is moved in one direction the convolutions of said spring element are progressively pressed into engagement with the registering convolutions of said resistor element, and are progressively disengaged from the convolutions of the resistor element when said plunger is moved in the opposite direction.

2. A fluid pressure transducer as defined in claim 1, wherein said circuit connecting means further comprises means connecting one end of said resistor element to one end of said spring whereby said spring reduces the amount of resistance in said circuit as the convolutions thereof are progressively pressed into engagement with the convolutions of said element, and vice versa.

3. A fluid pressure transducer as defined in claim 2, wherein
   said resistor element is printed on the face of a ceramic chip, which is fixed transversely in said housing adjacent said one end thereof, and
   said conically coiled spring element is mounted in said housing normally to have at least a portion of its outermost convolution engaged with the outermost convolution of said resistor element, and with its innermost convolution operatively connected to said plunger for movement thereby toward and away from said resistor element.

4. A fluid pressure transducer as defined in claim 3, wherein said circuit connecting means further comprises a flexible metallic member electrically connected at one end to said innermost convolution of said spring element and at its opposite end to a terminal at the exterior of said housing.

5. A fluid pressure transducer as defined in claim 2, wherein said fluid pressure sensing means further comprises a flexible diaphragm sealingly secured around its marginal edge in said housing over said inlet, and
   said plunger is interposed between said diaphragm and said spring element for movement in said one direction by said diaphragm and in said opposite direction by said spring element.

6. A fluid pressure transducer as defined in claim 5, wherein said means connecting said plunger to said one element comprises
   a reciprocable spring retainer adjustably connected adjacent one end with said plunger and adjacent its opposite end with the opposite end of said spring element, and
   a second coiled spring surrounding said spring element and engaged at one end with a stationary surface on said housing and at its opposite end with a flange on said retainer, thereby to resist movement of said plunger in said one direction.

7. A fluid pressure transducer as defined in claim 6, including means operable from the exterior of said housing to adjust said spring retainer relative to said plunger, thereby to adjust the amount of said spring element that is engaged with said resistor element when said plunger is in one of its limit positions.

8. A fluid pressure transducer as defined in claim 1, wherein said spring element is a compression spring which resists movement of said plunger toward said resistor element.

9. A fluid pressure transducer as defined in claim 1, wherein said resistor element is formed on a stationery, plane surface formed in said housing adjacent said one end thereof to extend at right angles to the path of reciprocation of said plunger.

10. A fluid pressure transducer as defined in claim 9, wherein said means connecting said plunger to said one element comprises means supporting said spring element in said housing with the outer convolution thereof engaged with and electrically connected to the outer convolution of said resistor element, and with the inner convolution disposed to be shifted axially toward and away from said resistor element in response to the reciprocable movement of said plunger.

11. A fluid pressure transducer as defined in claim 10, including means operable from the exterior of said housing to adjust the amount of the outer convolution of said spring element which is engaged with the outer convolution of said resistor element when said inner convolution of said spring element is in its limit position remote from said resistor element.

12. In combination with an electrical circuit for indicating the change in the position of a plunger, which is reciprocated in response to forces externally of said circuit,
   a housing having said plunger supported therein for reciprocation between first and second limit positions in response to predetermined changes in said forces,
   a stationery member fixed in said housing adjacent one end thereof, and having on one side thereof a plane surface extending normal to the axis of reciprocation of said plunger,
   a flat, spirally shaped resistor element formed on said plane surface coaxially of said axis, and having one end thereof electrically connected to a first terminal which opens on the exterior of said housing,
   a conically coiled spring element mounted in said housing coaxially of said axis with one end thereof electrically connected to the opposite end of said resistor element, and with the opposite end thereof electrically connected to a second terminal which opens on the exterior of said housing in spaced, electrically insulated relation to said first terminal, and
   means connecting said plunger to one of said elements and operative upon movement of said plunger in opposite directions progressively to increase and decrease, respectively, the length of the spring element that is engaged with the registering resistor element, thereby to decrease and increase, respectively, the amount of resistance that is placed in the associated circuit between said terminals by said resistor element.

13. The combination as defined in claim 12, wherein said stationary member comprises a flat, ceramic member having thereon said plane surface facing said spring element, and said resistor element is printed on said plane surface with the outer end thereof being electrically connected to the outer end of the outer or largest winding of said spring element.

14. The combination as defined in claim 13, including
   means supporting said opposite end of said spring element in said housing for adjustment selectively toward and away from said resistor element, when said plunger is in one of its limit positions, thereby to adjust the amount of said spring element which is engaged with said resistor element, when said plunger is in said one limit position,
   said supporting means including means adjustable through an opening in said housing and from the exterior thereof to effect the adjustment of said one end of said spring element relative to said resistor element.

* * * * *